Figure 1:
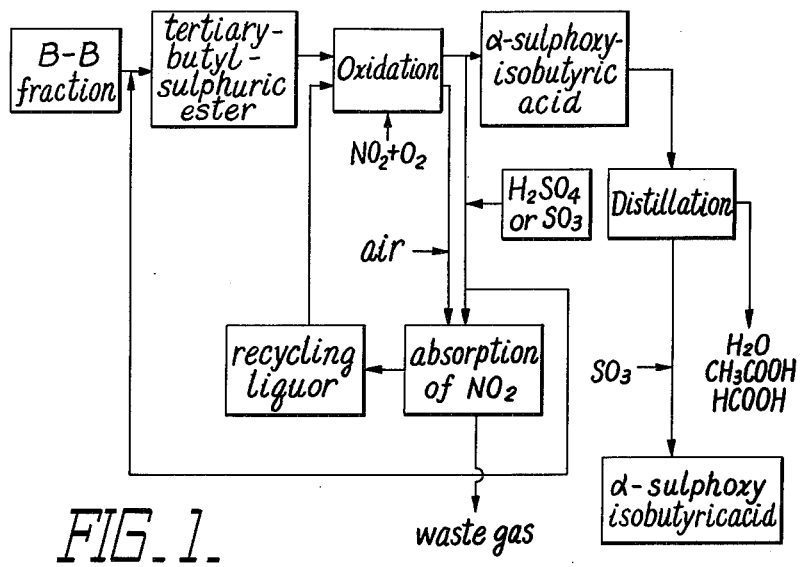

Hiroshi Akabayashi
Hiroshi Negishi
INVENTORS

BY
ATTORNEYS

United States Patent Office 3,198,823
Patented Aug. 3, 1965

3,198,823
PROCESS FOR MANUFACTURING α-SULPHOXY-ISOBUTYRIC ACID AND α-HYDROXYISOBUTYRIC ACID
Hiroshi Akabayashi and Hiroshi Negishi, Toshima, Kita-ku, Tokyo, Japan, assignors to Nissan Kagaku Kogyo Kabushiki Kaisha, Tokyo, Japan, a corporation of Japan
Filed July 3, 1962, Ser. No. 207,268
Claims priority, application Japan, July 8, 1961, 36/23,944; Oct. 4, 1961, 36/35,439; Dec. 6, 1961, 36/43,546; Dec. 20, 1961, 36/46,013
8 Claims. (Cl. 260—458)

The present invention relates to a novel process for manufacturing derivatives of isobutyric acid. More particularly, it pertains to a process for the production of α-sulphoxyisobutyric acid and derivatives thereof which are useful as the intermediate compounds for preparing esters of methacrylic acid.

The process according to the present invention comprises the steps to prepare α-sulphoxyisobutyric acid, bis-(1-methyl-1-carboxy-ethyl) sulphate and mixtures thereof by introducing gas mixtures containing isobutylene in sulphuric acid solutions with $H_2SO_4$ content of from 60% to 80%, and oxidizing the solutions of tertiarybutylsulphuric esters thus obtained by contacting with oxidizing agent selected from the group consisting of $HNO_3$, $NO_2$, $NO_2+O_2$, $N_2O_3$ and mixtures thereof. When these resultant reaction products are subjected to a further neutralization and hydrolysis, there can be obtained α-hydroxyisobutyric acid. On the other hand, when the aforementioned reaction products are subjected to a further esterification with appropriate alcohols, there can be directly obtained esters of α-hydroxyisobutyric acid. A principal object of the present invention is to provide a process, wherein a butane-butylene fraction (hereinafter called B—B fraction) obtained in thermal cracking of hydrocarbons can be directly subjected to an oxidation step without any preliminary isolation step of isobutylene.

Another object of the invention is to provide a process, in which the oxidation step can be carried out without any danger and at the same time with a high velocity. Still another object of the invention is to provide a process wherein the abovementioned oxidation step is carried out at a temperature near to the room temperature, so that the cooling equipment in the reaction vessel can be simplified. Other objects and advantages of the invention will become apparent as this disclosure proceeds.

Up to the present, esters of methacrylic acid have been manufactured by a process, in which acetone and cyanic acid are converted into the said esters via acetone-cyanohydrin as an intermediate compound, and by another process wherein α-nitratoisobutylene, obtained by the oxidation of isobutylene with $NO_2$ or $HNO_3$, is converted to α-hydroxyisobutyric acid which are then subjected to esterification followed by dehydration. These processes have been disclosed, for instance, in the specifications of Japanese Patent Publication No. 36-3566, U.S. Patents 2,811,546, and 2,971,981, British Patents 852,664 and 838,685, U.S. Patents 2,847,465 and 2,847,453. Besides, there is still another process wherein isobutylene is subjected to oxidizing by means of air or oxygen to form methacrolein which is then subjected to further oxidation to be converted into methacrylic acid. When isobutylene is oxidized by means of nitric acid, α-hydroxyisobutyric acid is formed as an intermediate compound, which is then converted into methacrylic acid. As for the preparation of esters of α-sulphoxyisobutyric acid, they have been obtained by sulfonation of esters of α-hydroxyisobutyric acid with chlorosulfonic acid, as described in the specification of British Patent 409,733, and esters of methacrylic acid have been manufactured therefrom.

Butene-1 and isobutylene contained in the B—B fraction of the gas mixture from thermal cracking of petroleum or in the same B—B fraction after separation of butadiene, have so close boiling points that they can not be separated from each other by a physical means such as rectification. Accordingly, in order to separate isobutylene from the gas mixture, it should be blown into a 65% sulphuric acid so as to absorb selectively isobutylene therein, and next the said acidic solution should be subjected to dilution with water to about 45% of $H_2SO_4$ content followed by a heating, and then there can be recovered isobutylene in a relatively pure form. According to the said process, the resultant sulphuric acid, being diluted, can not be returned to the absorption step again and, moreover, during the stripping step polymerization and hydrolysis of isobutylene may take place to some degree, which cause a reduction in the yield of recovery. As the result, the cost of the isolated isobutylene may be raised to be several times higher comparing to the B—B fraction used as the ultimate raw material. Thus, the aforementioned processes, which are required to use such expensive isobutylene as a starting material, should be rather expensive.

When isobutylene is used as a starting material, the oxidation with nitric acid or nitrogen dioxide should be carried out at a relatively low temperature. This is due to the fact that isobutylene has the boiling point at a temperature of $-6°$ C. and the intermediate compound in the oxidation step has an explosive character, which requires an accurate control of the reaction temperature. If the reaction is carried out at such a low temperature, the reaction velocity is slow and a large equipment is required for maintaining the desired low temperature in the reaction vessel. Further, in the procedure for manufacturing esters of methacrylic acid from the α-hydroxyisobutyric acid thus obtained as an intermediate compound, some solvents and sulphuric acid are required for the esterification step and moreover sulphuric acid and phosphoric acid are also required in the subsequent dehydration step.

We have now discovered a simple and economical process for manufacturing α-hydroxyisobutyric acid, without the aforementioned faults. The new process comprises an absorption step of isobutylene with a sulphuric acid, followed by a direct oxidation step, wherein the loss of isobutylene is minimized and, moreover, the isolation step of isobutylene and concentrating step of sulphuric acid are not required. Furthermore, in the process according to the present invention, the oxidation step in which $HNO_3$, $NO_2$, $NO_2+O_2$ and $N_2O_3$ are used as oxidizing agents, can be carried out at a relatively high temperature such as at 20° C. so as to proceed the reaction rapidly, since explosive nitro-compounds are scarcely formed during this step. Accordingly, the reaction apparatus is relatively simple, which makes it possible to reduce the cost of construction.

As described above, the principal object of the present invention is to provide a process, wherein gas mixtures containing isobutylene are absorbed in sulphuric acid solutions and the solutions of mono- and di-tertiary-butylsulfates thus obtained are oxidized in a safe and rapid way by means of $HNO_3$, $NO_2$, $NO_2+O_2$ and $N_2O_3$ so as to form α-sulphoxyisobutyric acid, bis-(1-methyl-1-carboxyethyl) sulphate, α-hydroxyisobutyric acid (a hydrolyzed product therefrom) and mixtures thereof with sulphuric acid, which are the economical intermediate materials to prepare esters of methacrylic acid.

In the process according to the present invention, solvents such as carbon tetrachloride and nitroparaffin, which can dissolve $HNO_3$ and $NO_2$, may be used in the oxidation step. As the reaction is carried out at a relatively high temperature, the use of solvents makes the reaction more smooth, and the control of temperature may be easy and furthermore it facilitates the recovery of unreacted NO₂ and the subsequent esterification. As mono- and di-tertiarybutyl sulfates are used as the starting material, α-sulphoxyisobutyric acid, bis-(1-methyl-1-carboxy-ethyl) sulphate and α-hydroxyisobutyric acid and mixtures thereof are obtained with sulphuric acid. This is very advantageous for the following esterification and dehydration step. That is to say, α-sulphoxyisobutyric acid and bis-(1-methyl-1-carboxy-ethyl) sulphate can be easily esterified with alcohol and, at the same time, the resultant esters can be also easily desulphonated, owing to the characteristics of sulphuric ester. When they are converted to α-hydroxyisobutyric acid to some degree, there exists sulphuric acid equivalent thereof in the reaction system in all cases, and therefore, owing to the presence of the said sulphuric acid, the subsequent esterification and dehydration can be carried out in an easy way to attain the object.

As described above it is very advantageous in all means to use mono- and di-tertiarybutyl sulfates as starting materials and to use an oxidizing agent selected from a group of $HNO_3$, $NO_2$, $N_2O_3$ and $NO_2+O_2$ as oxidixing agent. The manufacture of mono- and di-tertiarybutyl sulfates, which is the first step in the present invention, is already known prior to our invention. That is to say, a gas mixture of butene-1 and isobutylene, contained in B—B fraction from petroleum cracking, is absorbed in a 65% sulphuric acid at the room temperature. In this procedure, the reaction can be carried out under the atmospheric pressure as well as under an elevated pressure, but it is necessary to select a suitable concentration of sulphuric acid.

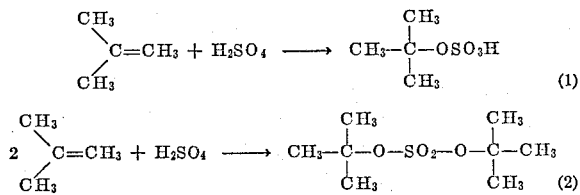

The Equation 1 indicates a case in which one mol of isobutylene is absorbed in a solution of one mol of sulphuric acid, and the Equation 2 indicates another case, in which two mols of isobutylene is absorbed in the same. When more than two mols of isobutylene is absorbed in a sulphuric acid solution, there is a possibility of mixing with butene-1, owing to a physical absorption thereof, and it becomes necessary to be subjected to a following refining step. According to our research, a proportion of 2.1 mols of isobutylene is the upper limit which can be used practically. As another embodiment of the present invention, it is also practicable to prepare the solution of tertiarybutyl sulfate by a reaction of tertiarybutanol with sulphuric acid, which should be used also as the starting material for the present process. As the resultant products, obtained by the reactions in the Equation 1 or 2, have a tendency to start polymerization after a long period of standing which convert into diisobutylene or triisobutylene, it is preferable to use them as soon as possible after preparation or to store them at a low temperature.

According to the process of the invention, a solution of mono- or di-tertiarybutyl sulfates or a mixture thereof is oxidized by means of an oxidizing agent selected from a group consisting of $HNO_3$, $NO_2$, $NO_2+O_2$ or $N_2O_3$ and a mixture thereof. The oxidation may be carried out in various ways depending upon the variety of equipments and oxidizing agents. When nitric acid is used as an oxidizing agent, it may be introduced in a reaction vessel at first, and then a solution of mono- and di-tertiarybutyl sulfates is dropped therein. In this case, the reaction temperature should be maintained in a range from 0° C. to 60° C. This is the same in case of using $NO_2$, $NO_2+O_2$ or $N_2O_3$ as described hereinafter. As for the concentration of nitric acid, it is preferable to use a solution of high concentration. When nitric acid is used for the oxidation, it is converted into $NO_2$ as shown in the following equations.

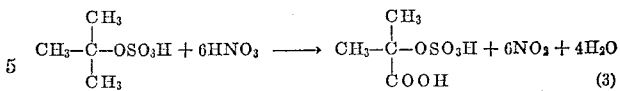

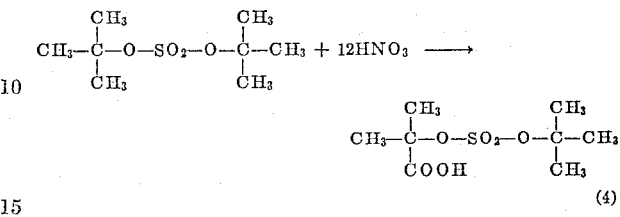

At the same time, $H_2O$ is produced. The formation of a large quantity of water reduces the concentration of the sulphuric acid used in the process, and it causes the hydrolysis of the starting materials into tertiarybutanol before the oxidation proceeds, which is then further oxidized to form several by-products such as acetic acid, formic acid, CO, $N_2$, $N_2O$ and others, whereby the yield of the objective compounds may be remarkably reduced. Therefore, the concentration of nitric acid should be over 60% of $HNO_3$. In a case of using a nitric acid, when the reaction temperature is kept higher than 20° C., the reaction proceeds in an instant. Sufficient quantity of nitric acid to be required is in a range from 5 mols to 12 mols, according to the Equations 3 and 4, but the quantity actually consumed for the reaction is less than the aforementioned range, owing to the presence of NO in the evolving gas mixture. If the introduction of tertiarybutyl sulfates is continued until the nitric acid in the reaction system is completely expended, some hydrolysis of the esters takes place, which causes the reduction of the yield of the objective compounds as abovementioned. In practice, a solution of tertiarybutyl sulfates is introduced till the concentration of nitric acid in the reaction system becomes to an extent of 30% as $HNO_3$, and then the reaction is stopped so as to recover the remaining nitric acid by distillation under a reduced pressure. When gaseous $NO_2$ is used in the reaction, it is initially dissolved in carbon tetrachloride or nitroparaffin, in which a solution of mono- and di-tertiarybutyl sulfates may be dropped in. It is also practicable that a solution of mono- and di-tertiarybutyl sulfates is dropped into the reaction vessel along with the introduction of gaseous $NO_2$ therein. In this case, a solvent may be used in the reaction system and it is also practicable to use a solution of oxidized products in place of a solvent, whereby $NO_2$ is introduced in the solution which was previously used.

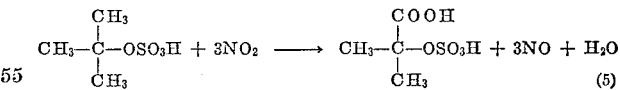

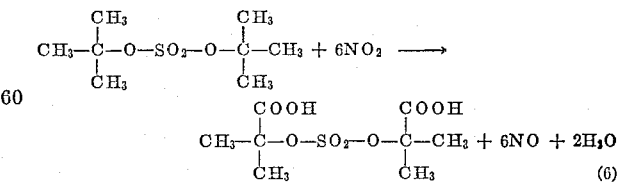

When $NO_2$ is used as an oxidant, there evolves $N_2$, $N_2O$ and others except NO, which cause a loss of oxidants. When the reaction temperature is higher, more disadvantages occur.

When $N_2O_3$ is used as an oxidant, the reaction is carried out in a similar manner as $NO_2$. As $NO_2$ and $N_2O_3$ are both reduced to NO, the evolving gas mixture is oxidized with oxygen or air to form $NO_2$, so as to be used again. Accordingly, it is more advantageous to use a gas mixture of $NO_2+O_2$ for the oxidation. When a solution of mono- and ditertiarybutyl sulfates is oxidized by means of a gas mixture of $NO_2+O_2$, the reaction may be carried out in a similar way as $NO_2$, and furthermore it is also possible to carry out the reaction in a continuous way. In this case, $NO_2$ acts as a catalyser so that the reaction can proceed as far as the oxygen is in existence.

When a gas mixture of $NO_2+O_2$, a solvent such as $CCl_4$ and a solution of mono- and di-tertiarybutylsulphuric esters are introduced continuously in a reaction vessel such as a tube-reactor, the reaction can be carried out continuously for a given period of time. On the other hand, it is also possible to carry out the reaction mildly and slowly without the presence of solvent, recycling a portion of the resultant solution of reaction products. In this case, the reaction period can be relatively long and the reaction can be carried out at a low temperature such as 0° C.

When the reaction is carried out in such a way, the consumption of $NO_2$ can be reduced considerably, so that the recovering of $NO_2$ may be unnecessary.

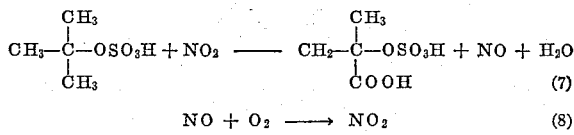
(7)

$$NO + O_2 \longrightarrow NO_2 \quad (8)$$

As the reaction products may contain acetic acid formic acid and other by-products as described above, they are subsequently removed together with unreacted $NO_2$ and $HNO_3$ by a vacuum distillation. When a solvent is used in the reaction, a considerable portion of α-hydroxyisobutyric acid formed by the hydrolysis may be transferred into a layer of the solvent dissolved therein. Accordingly, this is especially advantageous for the case whereby the resultant products are subjected to a subsequent esterification without separating from the solvent.

As described above, the resultant products in the process according to the invention are α-sulphoxyisobutyric acid, bis(1-methyl-1-carboxyethyl)sulphate, α-hydroxyisobutyric acid and sulphuric acid, which is formed by the hydrolysis thereof, and the mixtures thereof. As the result, there exists sulphuric acid in the solution of resultant products in all cases, and this is the distinctive character of the present invention.

The presence of sulphuric acid therein brings some great advantages for the subsequent esterification and dehydration steps. That is to say, it facilitates the reaction as represented by the following Equations 9–13.

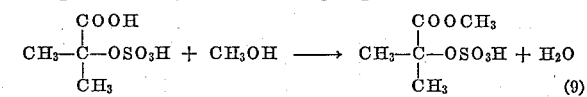
(9)

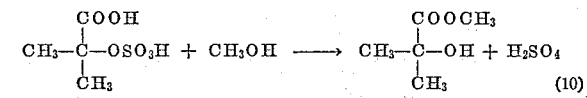
(10)

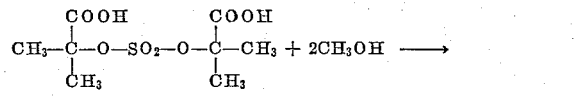

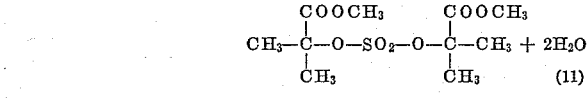
(11)

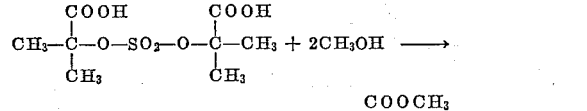

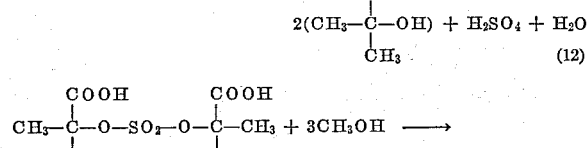
(12)

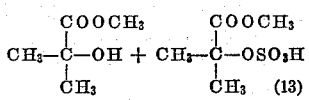
(13)

When the reactions represented by the Equations 9–13 are carried out under an elevated pressure or in the presence of a solvent, it is further facilitated, wherein the solvent which was once used in the preceding oxidation step, can be applied directly to reuse. Because of using a solution of mono- and di-tertiarybutyl sulfates as starting material, the process has the benefits that the oxidizing reaction can be carried out smoothly without any danger, whereby a high yield is obtained.

Figure 2:
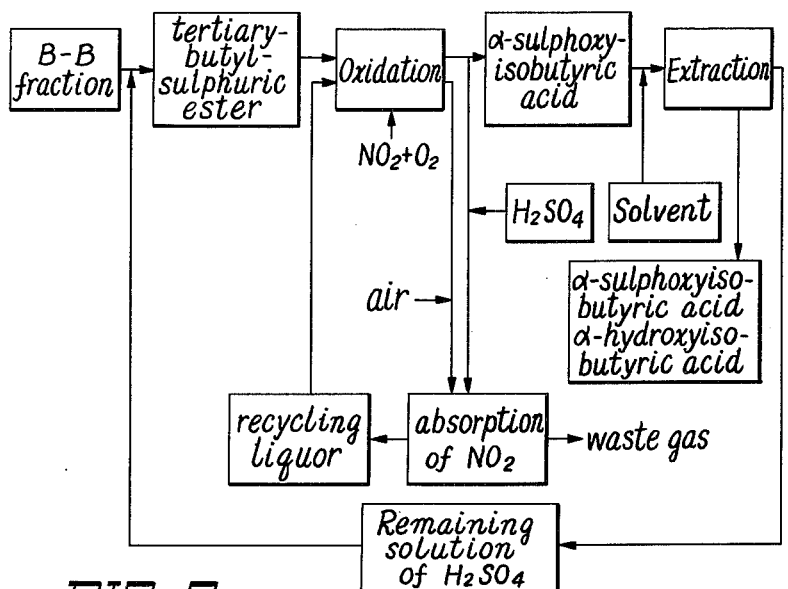

In the accompanying drawings, FIG. 1 shows a flow-diagram illustrating an embodiment of the present invention, in which a portion of the oxidized solution is recycled to the absorpton step of B—B fraction, and FIG. 2 shows a flow-diagram illustrating another embodiment of the present invention in which the resultant α-sulphoxyisobutyric acid is extracted by means of a solvent and the remaining aqueous layer is returned to the absorption of B—B fraction.

As for the concentration of sulphuric acid used for the absorption, it is most preferable to use a solution of 65% as $H_2SO_4$. With higher concentration of $H_2SO_4$ than 65% in this step, isobutylene tends to polymerize to form di- and tri-isobutylene, causing a reduction in the yield of the objective products. When the concentration of $H_2SO_4$ is lower than 65%, the absorption rate of isobutylene is reduced to some degree and moreover isobutylene tends to take place hydrolysis. Thus, in the process according to the invention, when isobutylene is absorbed by means of a recycled solution containing the resultant α-sulphoxyisobutyric acid, the concentration of $H_2SO_4$ therein should be preferably maintained to be 65%.

The oxidizing reaction itself can be effectively run at any temperature above 0° C. up to about 60° C., however, it is preferred to maintain the temperature in the range between 5° C. and 30° C. to speed up the oxidation and to minimize side reactions. When it rises over 60° C., a violent side reaction takes place along with the formation of polymers, which is not undesirable for the purpose of this reaction.

The oxidation products are usually accompanied with a small quantity of by-products, such as formic acid, acetic acid, acetone, $HNO_3$, unreacted $NO_2$ and $H_2O$, so that it is necessary to remove almost all of the impurities by a distillation under a pressure of 5–10 mm. Hg and at a temperature of about 60° C. The resultant product thus obtained consists of α-sulphoxyisobutyric acid, α-hydroxyisobutyric acid, $H_2SO_4$ and $H_2O$. The subsequent treatment of this product may contain the following two procedures depending upon the ways which lead to the formation of methacrylic acid.

(1) By extracting with ethyl-ether, ethylene-dichloride or hot benzene from the oxidized solution, a mixture of α-hydroxyisobutyric acid and α-sulphoxyisobutyric is obtained, while the remaining solution of $H_2SO_4$ is recovered. A portion of the sulphuric acid is removed from the reaction system, and the remaining part thereof is returned to the absorption step of isobutylene, after controlling its concentration by addition of 98% $H_2SO_4$ or $SO_3$. In the abovementioned extraction column, a considerable number of plates are required to be used.

(2) By introducing gaseous $SO_3$ into the solution of oxidized products, the $H_2O$ in the solution is converted into $H_2SO_4$.

As already stated, a principal advantage of the present invention to provide a process wherein a solution containing the oxidized products and sulphuric acid or a solution of recovered sulphuric acid is effectively utilized in the subsequent absorption step of isobutylene. Another advantage of the present invention is the utilization of NO in the vent gases, which is effectievly oxidized with air or oxygen and recycled into the reaction zone with very small amount of losses.

As represented in the following equations, when mono- and di-tertiarybutyl sulfates are oxidized with nitric acid, nitrogen peroxide or gaseous mixtures of nitrogen peroxide and oxygen, a considerable qauntity of water is formed along with the proceeding of the reaction.

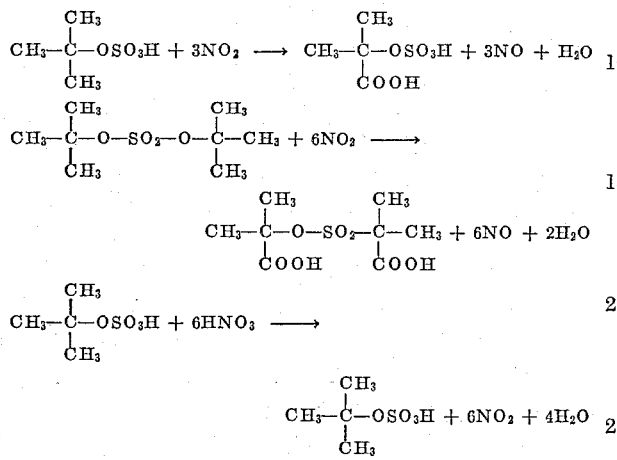

In case of oxidizing tertiarybutyl sulfates, the quantity contained in the reaction system causes a serious question. With lower proportions of water in the solution of tertiarybutyl sulfates, in consequence, with higher concentration of sulphuric acid therein, polymerization of the tertiarybutyl sulfates tends to take place to some extent forming diisobutylene. On the contrary, with higher proportions of water therein, hydrolysis of the tertiarybutyl sulfate tends to take place to form tertiary butanol. Accordingly, the concentration of the tertiarybutyl sulfates should be accurately controlled to be maintained in the range from 60% to 80% in the initial solution.

When tertiary butanol is formed in the reaction zone, it is oxidized by nitric acid or nitrogen peroxide to form acetone, acetic acid, formic acid and water whereby the yield of the objective compounds is reduced considerably. Especially, in case of using di-tertiarybutyl sulfate, the reduction in the yield is remarkable.

Now, we have discovered that, in the purpose of preventing such reduction in the yield, it is very effective to carry out the oxidizing in the presence of sulphate ion such as sulphuric acid, ammonium sulphate, sodium sulphate, potassium sulphate and others in the reaction system. Although, in case of using mono- and di-tertiarybutyl sulfates as the starting materials, there exists originally a quantity of sulphate ion corresponding to a proportion in the range from 0.5 mols to 1 mol per one mol of isobutylene in the reaction system, but according to the present invention it has been found that the presence of additional sulphate ion is necessary for the purpose.

As already described, there are two ways of operation for oxidizing mono- and di-tertiary butyl sulphates, that to say; a batchwise operation and a continuous operation. In case of a batchwise operation, sulphuric acid, ammonium sulphate, sodium sulphate or potassium sulphate is previously fed into a reaction vessel, into which nitric acid, nitrogen peroxide or gas mixtures of nitrogen peroxide and oxygen are introduced along with a solution of tertiarybutyl sulfates. As for the proportions of sulphate ion to isobutyl radical, the oxidizing reaction itself can be effectively run at any ratio higher than 1 to 1, whereby the quantity of sulphate ion contains the sulphate ion in the tertiarybutyl sulfate, however, it is more advantageous to use a considerable excess of sulphate ion. Especially, when the proportions are more than 1.5 mols of sulphate ion to 1 mol of butyl radical in the reaction system, the yield of the objective compound is improved considerably.

The present invention will be further illustrated by the following examples, but it will be understood that the invention is not limited thereto.

*Example 1*

A stream of a gaseous mixture of nitrogen peroxide and oxygen was bubbled into 2 kg. of 40% nitric acid, simultaneously 135 kg. of a solution containing 100 kg. of tertiarybutyl sulfate was charged therein by dropping while maintaining the reaction mixture at a temperature between 45° C.-55° C. A portion of the evolving gas mixture containing nitrogen peroxide and nitrogen oxide was recycled to be reused with addition of oxygen. After the dropping had been completed, the reaction mixture was allowed to stand for about one hour at a temperature of 50° C. Vacuum distillation was then employed to recover 5.8 kg. of 13% nitric acid. 147 kg. of a solution containing 110 kg. of α-sulphoxyisobutyric acid was obtained as the resultant product.

*Example 2*

A stream of a gaseous mixture of nitrogen peroxide and oxygen was bubbled at a rate of 85 gr./hr. for $NO_2$ and a rate of 62 gr./hr. for $O_2$ into 1.1 kg. of a solution containing 800 gr. of α-sulphoxyisobutyric acid which had been obtained in Example 1 as an intermediate before distillation. Simultaneously, a solution containing 74% of tertiarybutyl sulfate was fed by dropping at a rate of 140 gr./hr. while maintaining the reaction mixture at a temperature of 30° C. over a period of 10 hours. After the reaction had been completed, the reaction mixture was distilled at a temperature of 60° C. in a vacuum to remove the remaining nitrogen peroxide, nitric acid and nitrogen oxide. A solution of 2560 gr. containing 1940 gr. of α-sulphoxyisobutyric acid was obtained as the resultant product.

*Example 3*

A stream of a gaseous mixture of nitrogen peroxide and oxygen was bubbled at a rate of 15 gr. of $NO_2$ and 15 gr. of $O_2$ per hour into 1.1 kg. of a solution which was same as the starting solution in Example 2. Simultaneously, a solution containing 74% of tertiarybutyl sulfate was fed by dropping at a rate of 25 gr./hr. while maintaining the reaction mixture at a temperature of 10-12° C. under stirring over a period of 24 hours. After the reaction had been completed, the reaction mixture was distilled at a temperature of 60° C. in a vacuum to remove the remaining nitrogen peroxide, nitric acid and nitrogen oxide. A solution of 1740 gr. containing 1280 gr. of α-sulphoxyisobutyric acid was obtained as the resultant product.

*Example 4*

14 kg. of B—B fraction obtained by thermal cracking of petroleum, which contained 42% of isobutylene, 21% of butene-1, 18% of butene-2, 14% of n-butane, 3% of isobutane and 2% of others, was mixed with 10 kg. of 65% sulphuric acid at a temperature between 10° C. and 20° C. under a pressure of 2–3 kg./cm.² so as to react only isobutylene with sulphuric acid preferentially. A portion of the solution thus obtained, which contained 33% of mono-tertiarylbutyl sulfate and 45% of di-tertiarybutyl sulfate, as introduced into 200 gr. of carbon tetrachloride at a rate of 2.4 gr./min. along with the introduction of a gas mixture of $NO_2+O_2$ at a rate of 5.2 gr./min., while maintaining the reaction mixture (700 gr. in total) at a temperature between 20° C. and 30° C. The resulting mixture contained α-sulphoxyisobutyric acid and bis(1-methyl-1-carboxy-ethyl) sulphate, while the latter converted partially into α-hydroxyisobutyric acid due to a hydrolysis, which was dissolved in the under layer of carbon tetrachloride. Vacuum distillation was then employed to remove carbon tetrachloride, nitrogen peroxide, nitrogen oxide and nitric acid. A solution of 870 gr. which contained 552 gr. of α-sulphoxyisobutyric acid and 110 gr. of α-hydroxyisobutyric acid was obtained as the resultant product.

Example 5

6.1 kg. of solution containing 2 kg. of tertiarybutyl sulfate and 2.7 kg. of di-tertiarybutyl sulfate was fed at a rate of 100 gr./min. into a tube-reactor along with the feeding of $NO_2$ at a rate of 135 gr./min. and $O_2$ at a rate of 92 gr./min. The reaction mixture was cooled by external coolant to hold the temperature between 20° C. and 40° C., while a portion of the reaction product was recycled into the reaction zone. After a contacting period of from 2 min. to 3 min., the reaction product was discharged therefrom continuously. The remaining nitrogen peroxide in the reaction product was stripped by means of air and then it was distilled under vacuum at a temperature between 40° C. and 60° C. to remove nitric acid, acetic acid, formic acid and other by-products. The resultant product of 7.64 kg. contained 62% of α-sulphoxyisobutyric acid and 10% of α-hydroxyisobutyric acid.

Example 6

6.1 kg. of a solution same as Example 5 was charged by dropping into a solution of 50 kg., which contained 28 kg. of α-sulphoxyisobutyric acid and 8 kg. of nitrogen peroxide, while maintaining the reaction temperature between 15° C. and 20° C. under stirring. The reaction period was about 30 hours, during which a portion of the reacted nitrogen peroxide was vented from the reaction zone as nitrogen oxide or nitrogen and the other portion thereof remained in the reacting liquid as $H_2O_3$. After the reaction had been completed, the reaction mixture was heated to 60° C. along with bubbling of air to sweep out the remaining nitrogen peroxide and then vacuum distillation was employed to recover nitric acid and low-molecular fatty acid. The resultant oxidation product of 49 kg. contained 32.7 kg. of α-sulphoxyisobutyric acid and 0.8 kg. of α-hydroxyisobutyric acid.

Example 7

A solution containing 33% of mono-tertiarybutyl sulfate and 45% of di-tertiarybutyl sulfate, which had been obtained by extracting B—B fraction with 65% sulphuric acid, was fed into an oxidizing reactor at a rate of 188 kg./hr., while introducing air at a rate of 206 kg./hr. along with a recycling solution of 25% nitrogen peroxide, 43% α-sulphoxyisobutyric acid, 22% sulphuric acid and 9% water at a rate of 259 kg./hr. The reaction temperature was held in a range from 20° C. to 40° C. The resultant mixture was discharged therefrom at a rate of 470 kg./hr. A portion of the said mixture was subjected to a distillation followed by a dehydration with addition of $SO_3$. A solution containing 79% α-sulphoxyisobutyric acid and 21% sulphuric acid was obtained at a rate of 271 kg./hr. The residual portion of the mixture was compensated with 98% sulphuric acid at a rate of 40 kg./hr. and with nitrogen peroxide at a rate of 3 kg./hr., which had been formed by contacting vent gas with air, and then it was used again as a recycling oxidant.

Example 8

11.05 kg. of a solution containing 4.60 kg. of α-sulphoxyisobutyric acid, 4.95 kg. of ammonium sulphate and 1.50 kg. of water was charged into a reaction vessel. 10.28 kg. of a solution containing 7.70 kg. of tertiarybutyl sulfate was fed by dropping therein over a period of 4 hours along with bubbling of a gas mixture of nitrogen peroxide and oxygen, which was always controlled to be excess, while maintaining the reaction temperature in a range from 20° C. to 35° C. The resultant product contained 13.35 kg. of α-sulphoxyisobutyric acid, whereby the yield was 95%.

Example 9

6.98 kg. of a solution containing 4.60 kg. of α-sulphoxyisobutyric acid, 0.08 kg. of sulphuric acid and 1.78 kg. of sodium sulphate was charged into a reaction vessel. 13.83 kg. of a solution containing 3.55 kg. of sodium sulphate and 7.70 kg. of tertiarybutylsulphuric ester was introduced therein along with bubbling of gaseous nitrogen peroxide. The resultant product contained 13.53 kg. of α-sulphoxyisobutyric acid, the yield of which was 97%.

Example 10

11.33 kg. of 100% nitric acid and 2.00 kg. were charged into a reaction vessel, wherein 4.70 kg. of a solution containing 1.54 kg. of mono-tertiarybutyl sulfate and 2.10 kg. of di-tertiarybutyl sulfate was fed by dropping, so as to proceed the reaction. As the resultant product, 4.75 kg. of α-sulphoxyisobutyric acid was obtained, whereby the yield was 86%.

Example 11

In a tube-reactor, 9.40 kg. of a solution containing 33% of mono-tertiarybutyl sulfate and 45% of di-tertiarybutyl sulfate, and a solution containing 30% of α-sulphoxyisobutyric acid, 16% sulphuric acid and 54% of nitrogen peroxide were charged at a rate of 78 g./min. and a rate of 153 gr./min. respectively so as to proceed the reaction. The yield of resultant α-sulphoxyisobutyric acid was 95%.

Example 12

In a tube-reactor, a solution containing 26% of mono-tertiarybutylسulfate, 35% di-tertiarybutyl sulfate and 21% of α-sulphoxyisobutyric acid was fed at a rate of 99 gr./min., simultaneously a solution of 35% sulphuric acid and 65% α-sulphoxyisobutyric acid was fed at a rate of 71 gr./min., and a gas mixture containing 74% of nitgrogen peroxide and 26% of oxygen was introduced at a rate of 112 gr./min., while maintaing the reaction temperature in a range from 20° C. to 40° C. The yield of the resultant α-sulphoxyisobutyric acid was 97% based on the original quantity of tertiarybutyl sulfates fed to the reactor.

We claim:
1. A process for producing α-sulphoxyisobutyric acid and α-hydroxyisobutyric acid which comprises oxidizing a tertiarybutyl sulfate selected from the group consisting of mono-tertiarybutyl sulfate, di-tertiarybutyl sulfate and mixtures thereof by contacting said butyl sulfate with an oxidant selected from a group consisting of nitric acid, nitrogen peroxide, nitrogen peroxide with oxygen, dinitrogen trioxide and mixtures thereof at a temperature between 0° C. and 60° C. in the presence of sulphate-ion in the reaction system.

2. A process according to claim 1, wherein the oxidation is carried out at a temperature between 5° C. and 30° C.

3. A process according to claim 1, wherein mono- and di-tertiarybutyl sulfates as starting materials were prepared by absorption of butane-butylene fraction with sulphuric acid.

4. A process according to claim 1, wherein the oxidation is carried out in the presence of at least 1 mol of sulphate ion per 1 mol of isobutyl radical in the reaction system.

5. A process according to claim 4, wherein at least 0.5 mols of additional sulphate ion is supplied into the system as a member selected from a group consisting of sulphuric acid, ammonium sulphate, potassium sulphate, sodium sulphate and mixtures thereof.

6. A process according to claim 1, wherein the nitric oxide formed during the oxidizing reaction is re-oxidized by oxidizing agent selected from a group consisting of air, oxygen and mixtures thereof, so as to be re-used by re-cycling into the reaction zone.

7. A process according to claim 1, wherein the oxidant is dissolved in one portion of the oxidized product so as to be reacted by mixing with mono- and di-tertiarybutyl sulfates.

8. A process according to claim 1, wherein the reaction is carried out in presence of a solvent for nitrogen peroxide and nitric acid in the reaction system said solvent being selected from the group consisting of carbon tetrachloride and nitroparaffin.

References Cited by the Examiner

UNITED STATES PATENTS

| | | | |
|---|---|---|---|
| 2,811,546 | 10/57 | Robertson et al. | 260—486 |
| 2,847,453 | 8/58 | Gardner et al. | 260—466 |
| 2,847,465 | 8/58 | Robertson et al. | 260—533 |
| 2,971,981 | 2/61 | Aries | 260—553 |

CHARLES B. PARKER, *Primary Examiner.*